US007091703B2

(12) United States Patent
Folts et al.

(10) Patent No.: US 7,091,703 B2
(45) Date of Patent: Aug. 15, 2006

(54) DYNAMIC REACTIVE COMPENSATION SYSTEM AND METHOD

(75) Inventors: Douglas C. Folts, Baraboo, WI (US); William A. Vareka, Verona, WI (US); Arnold P. Kehrli, Middleton, WI (US); John A. Diaz De Leon, II, Madison, WI (US)

(73) Assignee: American Superconductor Corporation, Westborough, MA (US)

( * ) Notice: Subject to any disclaimer, the term of this patent is extended or adjusted under 35 U.S.C. 154(b) by 244 days.

(21) Appl. No.: 10/794,398

(22) Filed: Mar. 4, 2004

(65) Prior Publication Data

US 2005/0194944 A1 Sep. 8, 2005

(51) Int. Cl.
*G05F 1/70* (2006.01)
(52) U.S. Cl. .................... 323/207; 323/209
(58) Field of Classification Search ............. 323/205, 323/207, 208, 209, 210, 211
See application file for complete search history.

(56) References Cited

U.S. PATENT DOCUMENTS

| 3,958,153 | A | | 5/1976 | Narayan ..................... 317/27 R |
|---|---|---|---|---|
| 4,104,576 | A | * | 8/1978 | Frank .......................... 323/210 |
| 4,110,683 | A | | 8/1978 | Cason et al. ................... 324/52 |
| 4,128,805 | A | | 12/1978 | Lanz ............................. 324/52 |
| 4,307,331 | A | * | 12/1981 | Gyugyi ........................ 323/210 |
| 4,328,551 | A | | 5/1982 | Yamaura et al. ............. 364/492 |
| 4,785,405 | A | | 11/1988 | Hasegawa et al. .......... 364/480 |
| 4,857,821 | A | * | 8/1989 | Takeda ......................... 323/210 |
| 4,962,354 | A | | 10/1990 | Visser et al. ................. 323/360 |
| 5,099,190 | A | * | 3/1992 | Sato ............................. 323/210 |
| 5,134,356 | A | | 7/1992 | El-Sharkawi et al. ........ 323/211 |
| 5,138,247 | A | | 8/1992 | Tanoue et al. ............... 323/207 |
| 5,329,221 | A | | 7/1994 | Schauder ..................... 323/207 |
| 5,329,222 | A | | 7/1994 | Gyugi et al. ................. 323/207 |
| 5,343,139 | A | | 8/1994 | Gyugyi et al. ............... 323/207 |
| 5,351,181 | A | | 9/1994 | Brennen et al. .............. 363/71 |

(Continued)

FOREIGN PATENT DOCUMENTS

EP 0181575 5/1986

(Continued)

OTHER PUBLICATIONS

International Search Report mailed on Aug. 12, 2005 for International Application No. PCT/US2005/006852, filed on Mar. 4, 2005.

(Continued)

*Primary Examiner*—Jeffrey Sterrett
(74) *Attorney, Agent, or Firm*—Fish & Richardson P.C.

(57) ABSTRACT

The invention features a system for connection to a utility power network. The system includes a reactive power compensation device coupled to the network and configured to transfer reactive power between the utility power network and the reactive power compensation device; a capacitor system configured to transfer capacitive reactive power between the utility power network and the capacitor system; an electro-mechanical switch for connecting and disconnecting the capacitor system to the utility power network; an interface associated with the electro-mechanical switch; a controller configured to provide control signals for controlling the electro-mechanical switch; and a communication channel for coupling the controller to the interface associated with the electro-mechanical switch. The electro-mechanical switch, interface, controller, and communication channel together are configured to connect or disconnect the capacitor system from the utility power network within about three line cycles or less of the nominal voltage frequency when a fault condition is detected on the utility power network.

38 Claims, 8 Drawing Sheets

U.S. PATENT DOCUMENTS

| | | | |
|---|---|---|---|
| 5,422,561 A | 6/1995 | Williams et al. | 323/209 |
| 5,514,915 A | 5/1996 | Kim et al. | 307/64 |
| 5,519,312 A | 5/1996 | Wang et al. | 323/360 |
| 5,541,498 A | 7/1996 | Beckwith | 323/211 |
| 5,566,085 A | 10/1996 | Marceau et al. | 364/492 |
| 5,610,501 A | 3/1997 | Nelson et al. | 323/207 |
| 5,631,545 A | 5/1997 | Norman et al. | 323/205 |
| 5,642,007 A | 6/1997 | Gyugyi et al. | 307/102 |
| 5,644,218 A | 7/1997 | Emmerich et al. | 323/360 |
| 5,670,864 A | 9/1997 | Marx et al. | 323/211 |
| 5,698,969 A | 12/1997 | Gyugi | 323/207 |
| 5,703,791 A | 12/1997 | Amano et al. | 364/492 |
| 5,734,257 A | 3/1998 | Schauder et al. | 323/207 |
| 5,801,937 A | 9/1998 | Gold et al. | 363/141 |
| 5,814,975 A | 9/1998 | Nelson et al. | 323/207 |
| 5,883,796 A | 3/1999 | Cheng et al. | 363/40 |
| 5,939,798 A | 8/1999 | Miller | 307/64 |
| 5,943,246 A | 8/1999 | Porter | 364/528.28 |
| 5,969,509 A | 10/1999 | Thorvaldsson | 323/210 |
| 6,008,548 A | 12/1999 | Fenner et al. | 307/105 |
| 6,118,676 A | 9/2000 | Divan et al. | 363/34 |
| 6,121,758 A | 9/2000 | Bellina et al. | 323/211 |
| 6,215,202 B1 | 4/2001 | Luongo et al. | 307/64 |
| 6,327,162 B1 | 12/2001 | Larsen et al. | 363/51 |
| 6,359,423 B1 * | 3/2002 | Noro | 323/208 |
| 6,360,178 B1 | 3/2002 | Parsons et al. | 702/65 |
| 6,392,390 B1 * | 5/2002 | Ito et al. | 323/209 |
| 6,392,856 B1 | 5/2002 | Kehrli et al. | 361/64 |
| 6,414,853 B1 | 7/2002 | Buckles et al. | 363/14 |
| 6,445,555 B1 | 9/2002 | Buckles et al. | 361/19 |
| 6,573,691 B1 | 6/2003 | Ma et al. | 323/209 |
| 6,577,108 B1 | 6/2003 | Hubert et al. | 323/207 |
| 6,900,619 B1 * | 5/2005 | Kehrli et al. | 323/207 |
| 6,984,962 B1 * | 1/2006 | Angquist et al. | 323/207 |
| 2002/0075701 A1 | 6/2002 | Hubert et al. | 363/35 |
| 2002/0105231 A1 | 8/2002 | Koeppe et al. | 307/64 |

FOREIGN PATENT DOCUMENTS

| | | |
|---|---|---|
| JP | 59052809 | 3/1984 |
| JP | 59218700 | 12/1984 |
| JP | 01019929 | 1/1989 |
| JP | 01235315 | 9/1989 |
| JP | 5030686 | 2/1993 |
| JP | 05268727 | 10/1993 |
| WO | WO 96/19025 | 6/1996 |
| WO | WO 01/41545 | 6/2001 |

OTHER PUBLICATIONS

"Academic Press dictionary of science and technology", 1992, Academic Press, Inc., p. 489.

Borgard, L., "Grid Voltage Support at Your Fingertips", Nov. 1999, Transmission & Distribution Wolrd Magazine.

Gyugi, L., "Solid-State Synchronous Voltage Sources for Dynamic Compensation and Real-Time Control of AC Transmission Lines", 1993, IEEE Standard Press.

MGE UPS SYSTEMS, "Second Generation of High Power Active Harmonic Conditioner based on the Current Injection Principle", Jun. 1998.

Rahim et al., IEEE Transactions on Energy Conversion, US, IEEE Inc., 11:175-180, 1996.

Sasaki et al, "A Study on Optimal Placement Problem of Fuel Cells into Distribution Systems", T. IEEE, vol. 114-B, No. 5, 1994, pp. 491-497.

Swain et al., "on Reactive Power Compensation", 1995, IEEE 0-7803-2559-1/95.

"Static Var Compensator (SVC)", Retrieved from the internet: <http://abb.co.../328B2ABF10F394208525683300504BBD>, 2 pages.

"SVC for steel", Retrieved on the internet: <http://www.abb.com/global/ABBZ...0C125684D00543B02>, 1 page.

"Flicker", Retrieved on the internet: <http://www.abb.com/GLOBAL/ABBZ...6C125684100D1127>, 1 page.

"How can this flicker reduction be achieved?", Retrieved on the internet: <http://www.abb.com/global/ABBZ...00440F24>, 2 pages.

"SVC Light adds power quality", Retrieved from the internet:<http://www.abb.com/global/ABBZ...0044BFB2>, 1 page.

"New power electronics product from Mitsubishi", Retrieved from the internet: <http:www.strategicnewpapers.com/hr/050100/ekect2.htm>, 1 page.

"SVC Light for Steel", Retrieved on the internet: <http:www.abb.co/GLOBAL/ABBZ...00357895>, 1 page.

"How can this improve your EAF economy?", Retrieverd from the internet: <http:www.abb.com/global/ABBZ;;;0044A17D>, 1 page.

R. Grunbaum, "SVC Light: A Powerful Means for Dynamic Voltage and Power Quality Control in Industry and Distribution", Retrieved from the Internet: <http:www.abb.com>, 6 pages.

"Distribution Static Compensator", Retrieved from the internet: <http:www.meppi.com;html/distribution_statcom.htm>, 2 pages.

Nelson et al., "Increasing the Capability of Voltage-Limited Distribution Feeders with Distribution Static Condensers", American Power Conference, Apr. 1995, pp. 1524-1529.

Siemens – Distribution Static Compensator [DSTATCOM™MV]from Siemens Power Transmission & Distribution pamphlet, 5 pages.

Siemens– "Dynamic reactive power compenstion at a steel manufacturing plant", Retrieved from the internet: <http:www.powerquality.de/eng/page29a.html>, 4 pages.

Siemens– "Fast Reactive Power Compensation / Flicker reduction at a welding plant", Retrieved from the internet: <http:www.powerquality.de/eng/pagfe29b.html>, 5 pages.

Siemens –"Harmonic Current compensation at a waste water pump station", Retrieved from the internet: <http:www.powerquality.de/eng/page29c.html>, 3 pages.

"Static Synchronous Compensator: an additonal tool for improved utilization of power systems", ABB STATCOM Power System, Pamphlet A02-0165E, 4 pages.

* cited by examiner

DYNAMIC REACTIVE COMPENSATION SYSTEM AND METHOD

BACKGROUND OF THE INVENTION

This invention relates to electric power utility networks including generating systems, transmission systems, and distribution systems serving loads.

To remain competitive, electrical utility companies continually strive to improve system operation and reliability while reducing costs. To meet these challenges, the utility companies are developing techniques for increasing the life of installed equipment, as well as, diagnosing and monitoring their utility networks. Developing these techniques is becoming increasingly important as the size and demands made on the utility power grid continue to increase. A utility power grid is generally considered to include both transmission line and distribution line networks for carrying voltages greater than and less than about 35 kV, respectively.

Voltage instability on the utility power grid is a critical problem for the utility industry. In particular, when a fault occurs on the transmission grid, momentary voltage depressions are experienced, which may result in voltage collapse or voltage instability on the grid. In general, such a fault appears as an extremely large load materializing instantly on the transmission system. In response to the appearance of this very large load, the transmission system attempts to deliver a very large current to the load (the fault). Detector circuits associated with circuit breakers on the transmission system detect the overcurrent situation immediately (i.e., within a few milliseconds.) Activation signals from the utility protective relays are sent to the circuit breaker which opens the circuit. The mechanical nature of the circuit breakers generally requires 3–6 cycles (i.e., up to 100 msecs) to open. When the breakers open, the fault is cleared. However, opening of the breakers triggers a sequence of events, which in the extreme can cause that portion of the transmission and distribution system to collapse. Specifically, when the breakers open, the voltage is still low (i.e., almost zero) and, because a portion of the transmission system has in effect been removed, the impedance of the system dramatically increases causing the appearance of an artificially high load. In this state the voltage is depressed and the current serving the load sharply increases. The sharp increase in the current generates enormous losses in the transmission and distribution systems. In some cases, because the load and impedance are high, the voltage on the grid may not return to normal, causing long-term voltage depression and the possible voltage collapse of the entire system. The potential for these voltage instability problems are further exacerbated as load requirements on the grid increase.

One approach for addressing this problem is to construct additional transmission lines, thereby negating the effects of the high losses and sharp increase in current flow caused by the opening of the breaker. However, providing such additional lines is expensive and in certain settings extremely difficult.

Various equipment and device solutions have also been developed to address these voltage instability and collapse problems, such as SVCs and STATCOMs as described in greater detail below. In general, such devices remove the losses contributing to the huge increase in current by temporarily injecting power into the system. These losses can be both resistive as well as reactive. To understand the difference between resistive and reactive losses, note that the general expression for average power (when waves of voltage and current are sinusoidal), is $$\frac{V_m I_m}{2} \cos\theta,$$

where $V_m$ and $I_m$ represent the peak voltage and current, respectively. Since the maximum value of a sine wave divided by the square root of 2 is the effective value, the equation for average power may be written as:

$$P = \frac{V_m}{\sqrt{2}} \frac{I_m}{\sqrt{2}} \cos\theta = VI\cos\theta$$

When V is in volts and I is in amperes, the power is expressed in watts. The instantaneous power is:

$$p = \left[\frac{V_m I_m}{2}\cos\theta - \frac{V_m I_m}{2}\cos\theta\cos 2\omega\tau\right] + \frac{V_m I_m}{2}\sin\theta\sin 2\omega\tau$$

The first two terms of the right side of this equation represent instantaneous real power. When $2\omega\tau$ is an odd multiple of $\pi$, the value of the real power is $$\frac{2V_m I_m}{2}\cos\theta = 2VI\cos\theta$$

When $2\omega\tau$ is a multiple of $2\pi$, the real power is 0. Hence real power in a single-phase circuit fluctuates between 0 and 2VI cos $\pi$ and has an average value of VI cos $\pi$. The third term of the right-hand member of the equation represents what is referred to as instantaneous reactive power, or, preferably, instantaneous reactive volt-amperes. Its equation is $$px = \left(\frac{V_m I_m}{2}\sin\theta\right)\sin 2\omega\tau$$

Thus instantaneous reactive volt-amperes fluctuate between $$+\frac{V_m I_m}{2}\sin\pi \text{ and } -\frac{V_m I_m}{2}\sin\pi.$$

Whereas the average value of the instantaneous reactive volt-amperes is zero, the maximum value is $$\frac{V_m I_m}{2}\sin\pi.$$

This is the value referred to when reactive volt-amperes are considered. Hence, $$Px = \frac{V_m}{\sqrt{2}} \frac{I_m}{\sqrt{2}} \sin\theta = VI\sin\theta$$

Reactive volt-amperes are expressed in VARs; a term coined from the first letters of the words "volt amperes reactive". Reactive volt-amperes considered over a period of time represent oscillations of energy between the source and the load. Their function is to supply the energy for magnetic fields and charging condensers, and to transfer this energy back to the source when the magnetic field collapses or when the condenser discharges. Although reactive volt-amperes, as such, require no average energy input to the generators, they do necessitate a certain amount of generator volt-ampere capacity and thereby limit the available power output of the generators. Reactive power is due to quadrature components of voltage and current and as such represents no average power. These additional losses, which increase the required total real power, are generally supplied by an average energy input to the generators.

Historically, power utilities address severe voltage stability and control issues on transmission and distribution grids with traditional Static VAR Compensator (SVC) and Static Synchronous Compensator (STATCOM) solutions. A STATCOM is a form of an SVC that uses power electronics (e.g., a voltage sourced inverter) to generate the VARs.

Referring to FIG. 1, an SVC 100 is shown to include a phase-controlled TCR (Thyristor Controlled Reactor) 102 and a set of TSCs (Thyristor Controlled Capacitors) 104 connected on the secondary side of a coupling transformer 106. SVC 100 provides reactive power from both TCR 102 and TSCs 104 when a fault is experienced on the utility grid. In particular, TCR 102 and TSCs 104 are connected to transformer via a medium voltage line 108 (12–20 KV). The primary side of transformer 106 is connected to the high voltage transmission line (e.g., >35 KV) 110. In normal operation, a TSC 104 is in the "on" condition all of the time while a TCR 102 is gated on at a specific phase angle every half-line-cycle to cancel out a portion of the capacitive VAR injection. For small phase angles, the conduction time and therefore the inductive VARs is small. For large phase angle approaching 180 degrees, the TCR 102 is essentially "on" the entire half-cycle and more of the capacitive VARs are canceled. A controller (not shown) provides control signals to the TSCs 104 and gating signals to the TCR 102 to allow for infinite control of VAR output from 0–100% depending on system need. Switching of TCR 102 and TSCs 104 occurs very quickly (e.g., within one-half line cycle) using thyristor switches 116. The TCR is sized to provide maximum lagging VARs, while the TSCs may be of the same or different sizes (e.g., 25–100 MVAR) to incrementally introduce capacitive VARs to the system. Thus, TCR 102 serves as a variable VAR compensation device while TSCs 104 serve as fixed but incrementally added/subtracted VAR compensation devices.

In operation, SVC system 100 regulates voltage at its terminal by controlling the amount of reactive power injected into or absorbed from the utility power system. When system voltage is low, SVC 100 generates reactive power (SVC capacitive). When system voltage is high, it absorbs reactive power (SVC inductive). More specifically, SVC 100 rapidly delivers the reactive power to shift the power angle, thereby raising or lowering the voltage on the network. SVC 100 continuously shifts the power angle in response to dynamic power swings on the transmission network due to changing system conditions.

SVC system 100 can also include smaller harmonic filter capacitors 112 (e.g. each 10–30 MVARs) that are always "on" and filter out higher harmonics (e.g., $5^{th}$ and $7^{th}$ order harmonics as tuned by inductors 113 in series with capacitors 112) generated by the natural action of the thyristors. SVC system 100 can also be used in conjunction with mechanically-switched capacitors 114 for voltage regulation.

Such static VAR compensators provide capacitive reactance for several reasons. First, utility power systems, particularly at the transmission level, are primarily inductive, due to the length of transmission lines and the presence of numerous transformers. Second, many of the largest loads connected to the utility power system are typically inductive. Large motors used, for example, in lumber mills, rock crushing plants, steel mills, and to drive pumps, shift the power factor of the system away from the desired unity level, thereby decreasing the efficiency of the power system. By selecting the proper amount of capacitance and connection location, the capacitor banks can provide a level of control of the line voltage, power factor, or volt-ampere-reactive (VAR) power. Because most inductive loads operate intermittently and cyclically, the correct compensation is generally applied selectively in response to the varying reactive load on the system.

SVCs and STATCOM systems have the attribute of being capable of providing rapidly changing VARs needed to regulate voltage and quickly drive post-contingency voltages to acceptable levels. The timeframe required for the solution's response is on the order of a few line-cycles of AC power (one line cycle is 16.7 mS for 60 Hz AC power systems) even though it is capable of responding on a sub-cycle basis. However, the primary disadvantage of SVC and STATCOM systems is their high cost.

SUMMARY OF THE INVENTION

The invention features a system and approach for providing dynamic reactive compensation to utility transmission and distribution grids. Reactive compensation is accomplished by injecting capacitive or inductive reactive current in shunt with a utility power network.

In one aspect of the invention, a system for connection to a utility power network includes a reactive power compensation device coupled to the network and configured to transfer reactive power between the utility power network and the reactive power compensation device; a capacitor system configured to transfer capacitive reactive power between the utility power network and the capacitor system; an electro-mechanical switch for connecting and disconnecting the capacitor system to the utility power network; an interface associated with the electro-mechanical switch; a controller configured to provide control signals for controlling the electro-mechanical switch; and a communication channel for coupling the controller to the interface associated with the electro-mechanical switch. The electro-mechanical switch, interface, controller, and communication channel together are configured to connect or disconnect the capacitor system from the utility power network within about three line cycles or less of the nominal voltage frequency when a fault condition is detected on the utility power network.

Embodiments of these aspects of the invention may include one or more of the following features. The electro-mechanical switch, interface, controller, and communication channel together are configured to connect or disconnect the capacitor system from the utility power network in less than about 80 msecs and preferably less than about 50 msecs from the time the fault condition is detected on the utility power network.

The communication channel is a fiber optic channel. The system further includes a number of capacitor systems, each configured to transfer capacitive power between the utility power network and a respective one of the capacitor systems. Each of the capacitor systems is coupled to a corresponding electro-mechanical switch, the controller being configured to operate each capacitor system using a corresponding electro-mechanical switch. In operation and following a predetermined time period, the controller monitors whether to activate or deactivate an additional one of the capacitor systems. The controller is configured to initially activate a predetermined subset of the capacitor systems.

The reactive power compensation device (e.g., an inverter) is configured to provide voltage regulation and prevent voltage collapse by quickly providing reactive power to the utility power network so as to rebuild system voltage back to within 10% of the nominal voltage within two seconds, preferably within one second. The reactive power compensation device may include an array of inverters.

The system further includes at least one mechanically-switched capacitor or reactor, each configured to transfer capacitive or inductive power to the utility power network in response to a signal from the controller.

The controller is configured to, in response to the need to connect at least one capacitor system to the utility power network, activate the reactive power compensation device and, substantially simultaneously, causes the at least one capacitor system to be connected to the utility power network.

In another aspect of the invention, a method for stabilizing a utility power network includes the following steps. A reactive power compensation device is electrically coupled to the network and is configured to transfer reactive power between the utility power network and the reactive power compensation device. At least one capacitor system including an electro-mechanical switch is electrically coupled to the network and is configured to transfer capacitive power between the utility power network and the at least one capacitor system. A fault condition is detected on the utility power network. In response to detecting the fault condition, at least one electro-mechanical switch is operated within about three line cycles or less of the nominal voltage frequency.

Embodiments of this aspect of the invention may include one or more of the following features. A controller is coupled to the electro-mechanical switch with a fiber optic communication channel. A plurality of capacitor systems is coupled to the utility power network, each associated with a corresponding electro-mechanical switch and each configured to transfer capacitive power between the utility power network and a respective one of the plurality of capacitor systems. A controller monitors whether to activate an additional one or a preset of the capacitor systems bank or deactivate one or a preset of the capacitor systems.

The controller controls the reactive power compensation device to quickly provide reactive power to the utility power network so as to boost voltage to 0.90 P.U. of the nominal line voltage within two seconds, preferably within one second. The reactive power compensation device comprises at least one inverter or an array of inverters.

In response to the need to connect the at least one capacitor system to the utility power network, the reactive power compensation device is activated and, substantially simultaneously, the at least one capacitor system is connected to the utility power network. Prior to detecting a fault condition on the utility power network, the reactive power compensation device is controlled to provide voltage regulation of the utility power network. Controlling the reactive power compensation to provide voltage regulation includes deactivating at least one of the capacitor systems if the nominal voltage on the utility power network is greater than a predetermined upper threshold (e.g., 1.04 P.U.). Controlling the reactive power compensation to provide voltage regulation also includes activating at least one of the capacitor systems if the nominal voltage on the utility power network is less than a predetermined lower threshold (e.g., 1.0 P.U.).

Deactivating the reactive power compensation device if bucking VARS are required and if a predetermined capacitor timing period (e.g., in a range between one second and several minutes) has expired. The capacitor timing period is dependent on the reactive power output of the reactive power compensation device. Activating the reactive power compensation device if boosting VARS are required and if a predetermined capacitor timing period has expired. If the nominal voltage on the utility power network is less than a predetermined fast control threshold (e.g., >10% of the nominal voltage): 1) activating at least one of the plurality of capacitor systems; and 2) controlling the reactive power compensation device to increase VAR injection from the reactive power compensation device.

The method further includes controlling the reactive power compensation device to increase VAR injection from the reactive power compensation device if boosting VARs are required, controlling the reactive power compensation device to decrease VAR injection from the reactive power compensation device if boosting VARs are not required and if the nominal voltage is less than a predetermined overvoltage threshold (e.g., 5% of the nominal voltage); and controlling the reactive power compensation device to increase VAR injection from the reactive power compensation device if boosting VARs are not required and if the nominal voltage is greater than the predetermined overvoltage threshold.

The method further includes deactivating at least one of the capacitor systems if the nominal voltage is greater than a fast capacitor removal threshold (e.g., >5% of the nominal voltage); and activating at least one of the capacitor systems if the nominal voltage is less than the predetermined fast control threshold.

The system and method are capable of attenuating rapid voltage variations and for providing post-fault voltage support to mitigate any tendency for voltage collapse. In addition to acting as a fast transient voltage support device, the system is also capable of regulating voltage at a point on the transmission or distribution grid and minimizing transients imposed on the fundamental waveform of a normal voltage carried on a utility power network when a reactive power source (e.g., capacitor bank) is connected to the utility power network. By integrating the dynamic VAR output of the reactive power compensation device (e.g., inverters) with very fast (e.g., 24 msecs) mechanically switched capacitor and reactor banks, the system becomes a very economical alternative to SVC's and equally effective at solving common transmission grid problems such as voltage instability and voltage regulation. SVC's and STATCOMs are faster than necessary to solve these problems and are very costly.

Conventional mechanically switched reactive devices, while of acceptable speed (>100 mS) for voltage regulation, are too slow to solve voltage instability. The invention addresses the speed limitations of conventional mechanical switches and uses them provide the bulk of the reactive power while the reactive power compensation device (e.g., inverters) provides a small (10–25%) but overly fast amount of reactive power. The reactive power compensation device generally only moves the voltage a few percent at rated output and thus the opportunity for unstable behavior and/or oscillations is significantly reduced. Thus, although the system of the invention has the same range as an SVC, the control of capacitors for slow control makes it look much smaller in the dynamic sense and hence precludes many of the instability problems. Further, because the cost of the system is about 25% less then a comparably sized SVC, the invention provides an economic alternative to STATCOM—based and SVC-based systems. The invention also uses electro-mechanical switches that are considerably less expensive than conventional thyristor switches used in an SVC.

These and other features and advantages of the invention will be apparent from the following description of a presently preferred embodiment and the claims.

DETAILED DESCRIPTION

Figure 2:
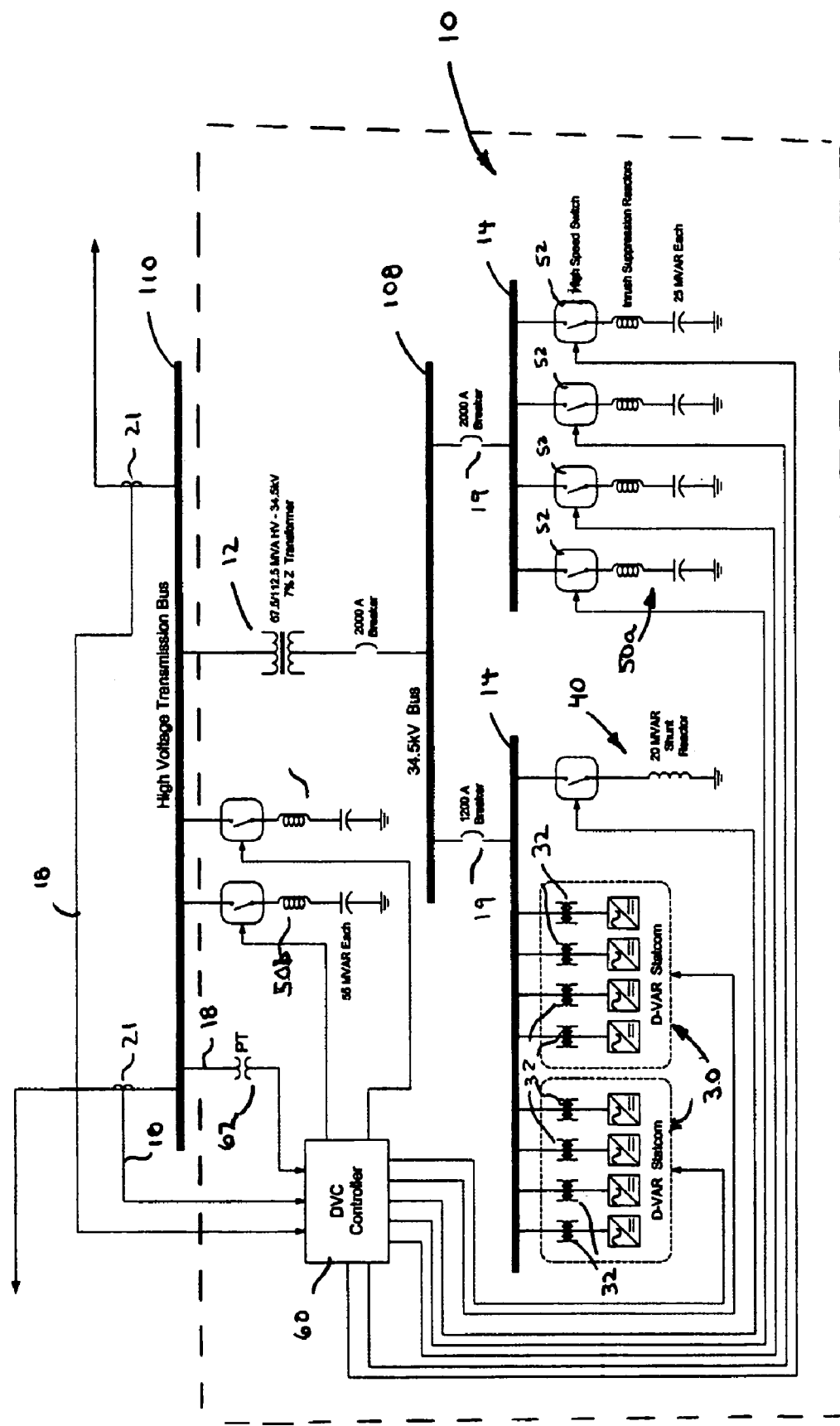
FIG. 2 is a block diagram of a dynamic voltage system including D-VAR® statcoms and fast-switched capacitor banks.

Referring to FIG. 2, a dynamic voltage system 10 is shown connected in shunt with a transmission line 110 of a utility power network via a first transformer 12, which steps down the higher voltage (e.g., greater than 35 kV carried on transmission line 110 to a lower voltage, here 34.5 kV, of a medium voltage bus 108. Dynamic voltage system 10 includes, in this embodiment, a pair of D-VAR® statcom systems 30, each of which are coupled to an internal bus 14 with summing transformers 32. D-VAR® statcom systems 30 are available from American Superconductor Corporation, Westboro, Mass. Because each D-VAR® statcom system 30 has a nominal 480 VAC output, two stages of transformation (transformers 12 and 32) to interface to a high voltage transmission system are used.

Dynamic voltage system 10 also includes a shunt reactor 40 and, in this embodiment, four capacitor banks 50a, each coupled to internal bus 14. Shunt reactor 40 provides negative (inductive) VARs over and above those provided by D-VAR® statcom systems 30 and capacitor banks 50a are capable of generating 20 MVAR and 25 MVARs of reactance per bank, respectively. Shunt reactor 40 and capacitor banks 50a are coupled through internal bus 14 to medium voltage bus 108 through appropriately sized circuit breakers 19. Dynamic voltage system 10 further includes, in this embodiment, a pair of capacitor banks 50b, each coupled to transmission line 110. Capacitor banks 50b are capable of generating 50 MVARs of reactance per bank, about twice as much MVAR capacity as capacitor banks 50a. Because capacitor banks 50b are connected directly to the higher voltage transmission bus 110 they provide a more cost-effective way of injecting a greater amount of capacitive reactance to the utility power network in the event of a fault.

Figure 1:
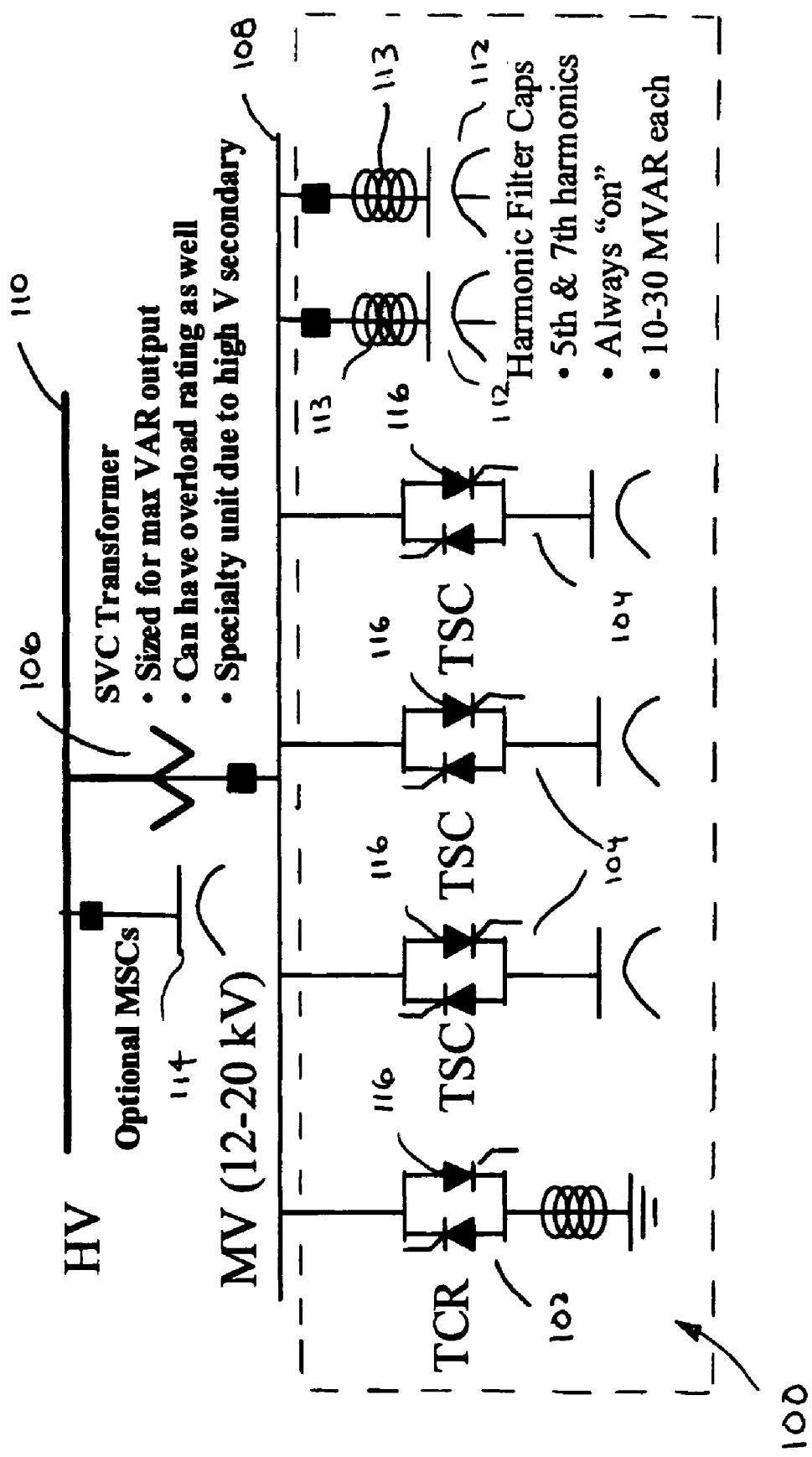
FIG. 1 is a block diagram of a conventional SVC system.

D-VAR® statcoms 30, reactor 40 and capacitor banks 50a, 50b are all controlled by a DVC controller 60 in response to voltage fluctuations sensed over signal lines 18, which are connected to the utility power network. In this embodiment, capacitor banks 50a, 50b may be used for voltage regulation in conjunction with "slower" mechanically-switched capacitor (MSCs) banks (i.e., switching times>6 line cycles). For example, capacitor banks 114, as shown in FIG. 1, represent the type of mechanically-switched capacitors which may or may not already be provided for voltage regulation by utility companies at a given substation. Utility MSCs can be controlled for long-term voltage regulation through a supervisory control and data acquisition (SCADA) interface. However, mechanically-switched capacitors 114 of the type shown in FIG. 1 are too slow for preventing voltage collapse.

In general, and as will be described in greater detail below, D-VAR® statcom systems 30 generate the dynamic, variable VAR component of the solution while capacitor banks 50a, 50b provide the incrementally or stepped capacitive VAR component of the system and shunt reactor 40 provides the incrementally or stepped inductive VAR component of the system. It should be appreciated that for purposes of clarity, only one of the three phases of the power system are shown. Also, certain components (e.g., fuses, protective relays, breakers) typically used in utility power systems are not shown in FIG. 2.

Figure 3:
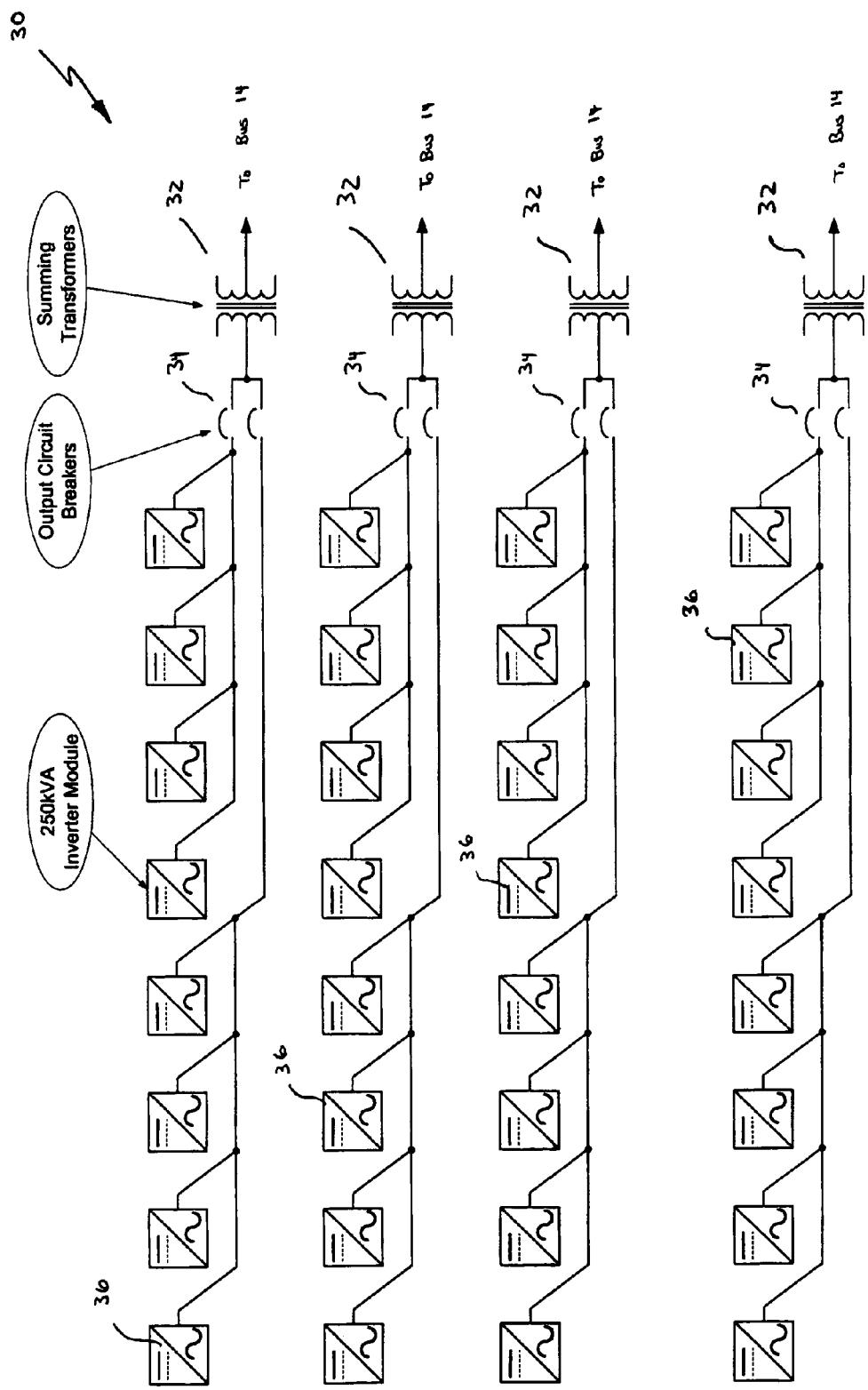
FIG. 3 is a block diagram of the D-VAR® statcoms of the dynamic voltage system of FIG. 2.

Referring to FIG. 3, each D-VAR® statcom system 30 which, in this example, includes thirty two 250 kVA inverter modules 36 whose outputs are combined on the medium-voltage side of the power transformers to yield the desired system performance. Depending on the implementation, suitable inverter modules include Power Module™ PM250, and Power Module™ PM1000, both of which are available from American Superconductor Corporation, Westboro, Mass. The inverter modules 36 are coupled to the secondary side of summing transformers 32 through circuit breakers 34.

Referring again to FIG. 2 and FIG. 4, to effectively address fault conditions sensed by controller 60, capacitor banks 50a and 50b, and reactor 40 must be capable of being added and removed as fast as possible to the intermediate (distribution voltage) and/or transmission voltage bus. Traditional circuit breakers, motor operated switches, or fast switches controlled through conventional utility signaling means are too slow. To overcome this problem, direct communication from controller 60 to high speed vacuum switches 52 are used to provide necessary trip (open) and close timing.

Figure 4:
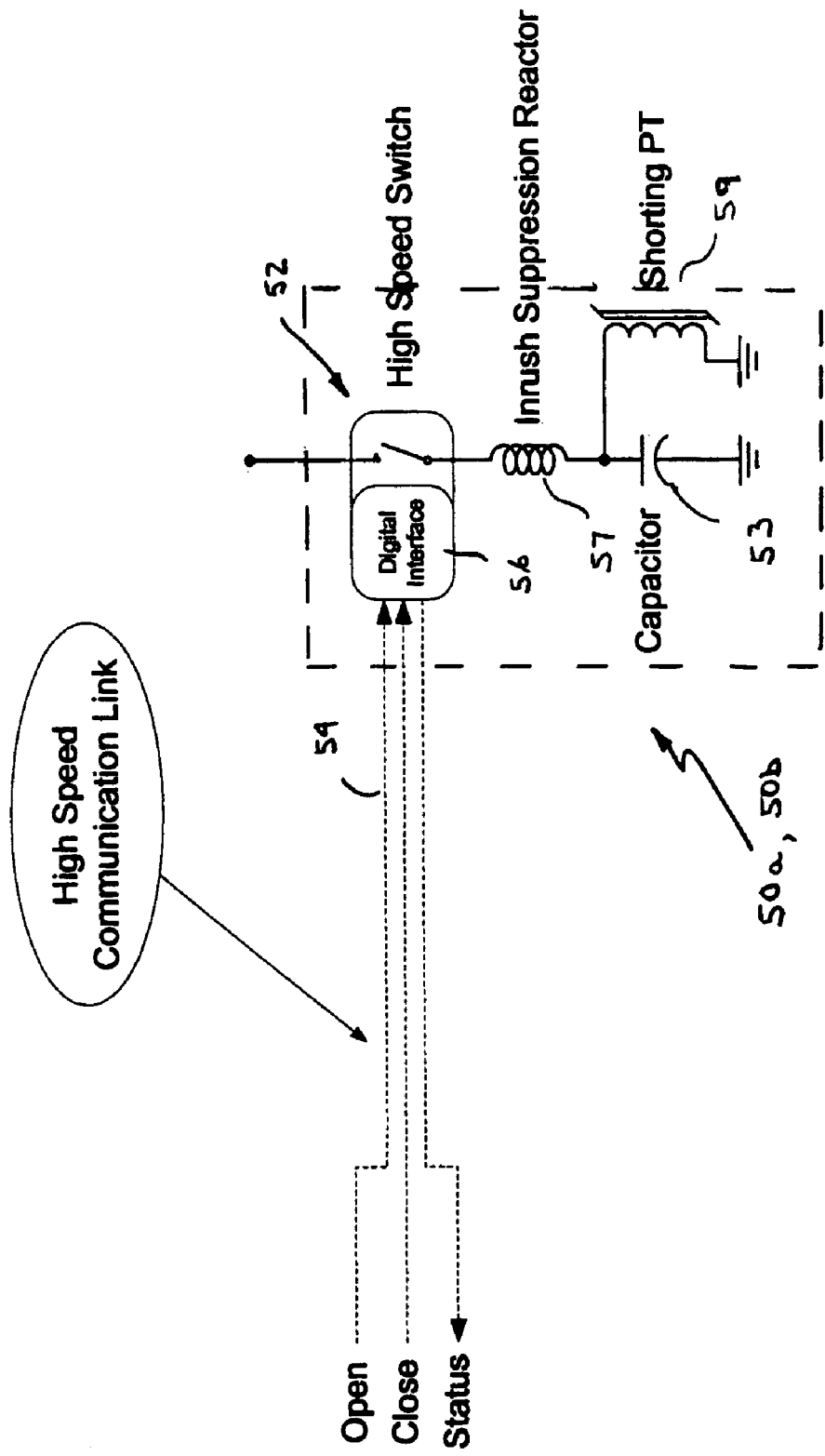
FIG. 4 is a block diagram of a fast-switched capacitor bank and the communication link of FIG. 2.

In particular, and as shown in FIG. 4, each capacitor bank 50a, 50b includes one or more capacitors 53, an inrush suppression reactor 57 and a vacuum switch 52. Control signals from controller 60 are received over a fiber optic communication line 54 and by a digital interface 56 of vacuum switch 52. One example of a fiber optic communication line suitable for use is a molded cable having industry standard 62.5/125 micron glass multimode fiber with ST connectors. A capacitor switch having suitable trip and close timing characteristics is the VBU switch, manufactured by Joslyn Hi-Voltage Corporation, Cleveland, Ohio. The Joslyn VBU switch possess trip and close timing characteristics of about 24 msecs or 29 msecs, respectively or 1.5 line cycles at 60 Hz. Each capacitor bank 50a, 50b includes an inrush suppression reactor 57. Each inrush suppression reactor 57 is used to limit the "inrush" or current when an additional discharged capacitor bank in parallel is activated with a capacitor bank that has already been activated.

Exemplary characteristics of a capacitor switch 52 suitable for use in dynamic voltage system 10 are shown below:

| Switch Opening (per pole) | |
|---|---|
| Direct Energy Voltage: | 40 VDC |
| Close Coil Resistance: | 2 ohms |
| Trip Timing | |
| from solenoid energization to contact part | 17 ms |
| from contact part to full open | 7 ms |
| total opening time (solenoid energization to full open) | |
| Direct Energy | 24 ms max. |
| Capacitor Discharge (reference) | 24 ms max. |
| Switch Closing (per pole) | |
| Capacitor Discharge Voltage | 250 V |
| Discharge Capacitance | 6500 mF |
| Close Timing (from solenoid energization to contact touch) | |
| Capacitor Discharge | 28 ms max. |
| 20 ms min. | |
| Control Response Time | |
| Analog Controls | 30 ms max. |
| Digital Controls | <1 ms. |

In a particular embodiment, the normal utility interface (Analog Controls) of the Joslyn VBU switch is bypassed so that communication of the trip (open) and close signals are provided directly to the switch trigger mechanism, thereby avoiding the time delay (30 msec) associated with the conventional analog interface.

Referring again to FIGS. 2 and 4, each switched capacitor bank 50a, 50b also includes a saturable reactor that is normally implemented in the form of a potential transformer (PT) 59 having a secondary (not shown) which can be used for diagnostic purposes or left open. When the high speed switch is closed, AC voltage is present on capacitor 53 of capacitor banks 50a, 50b and PT 59. When AC voltage is present, capacitor 53 appears to the PT like a high impedance load. But when the capacitor switch 52 opens, trapped charge on the capacitor bank appears like a DC voltage to the PT. At a time typically less than one AC line-cycle (17 mS) after the switch opens, the magnetic core of the PT will saturate. Once saturated, the PT's impedance drops several orders of magnitude and appears to the capacitor bank like a short circuit and quickly discharges the trapped charge within the capacitor; hence the name "Shorting PT". Quickly discharging the capacitor makes it available to be switched in by the DVC Controller as needed.

With respect to vacuum switches 52, communication signals "Open" and "Close" carried on communication line 54 are commonly required for fault tolerance. The "Status" signal is optional but almost always present as standard practice. The status signal can be one of many signals. For example, in one embodiment, one signal indicates the status of the switch (open or closed) while a second signal indicates diagnostic information ("Ready" versus "Fault"). In the preferred embodiment, both a status and fault signal are sent back to controller 60 at high speed. This way, if the controller 60 commands switch 52 to close but the status indicates that it did not close, the controller can quickly command a different switch to close. Likewise, if the controller is about to command one switch to close but that switch is reporting a fault, the controller can command a different switch to close instead. Thus, overall functionality and effectiveness of the dynamic voltage system 10 is not compromised in the event of a capacitor or high-speed switch failure.

D-VAR® Statcom and Capacitor Control

The control of the D-VAR® statcoms 30, reactor 40 and capacitor banks 50a, 50b is based on two different modes and time scales. The first time mode is based on providing long term regulation of the voltage on the utility power network while the second time mode is based on the occurrence of a significant fault on the high voltage transmission line 110. For all of the discussions that follow, approximate values for setpoints and thresholds will be given to facilitate the discussion. It should be appreciated that the user parameters discussed below can be modified depending on the particular application and conditions. Further, with reference to the adding or removing of capacitor banks, it is appreciated that inductive elements can also be added or removed, the net effect on the system voltage being equivalent from a slow steady control perspective.

In this context, the term 'regulation' is meant to infer the slowly varying control of the voltage on the utility power network. The time scales in this context being on the order of seconds. On the other hand, a fault event requires much faster response times (i.e., within a few line cycles or less). Controller 60 distinguishes between a regulation and a fault condition by comparing the currently measured voltage to the long term average (typically between 0.1 and 10 seconds). If there is a drop in the voltage of greater than 0.10–0.15 PU of the nominal voltage then the "fast" controls take over. Otherwise the system ignores smaller transients than this and responds in a voltage regulation mode. Each of these two modes is described in greater detail below and is understood to be one method of many to achieve the goal. The controller 60 typically receives a voltage signal from a Potential Transformer (PT) 62 (FIG. 2) connected to bus 110.

Voltage Regulation

The system has an adjustable band of acceptable voltage (e.g., from 1.00 to 1.04 PU). So long as the measured voltage on the transmission line remains within this band, controller 60 takes no action other than to compute a long term voltage average. If the voltage drifts slowly outside of these limits, controller 60 determines that the DVC statcoms 30 will need to respond. Controller 60 sends control signals to D-VAR® statcoms 30 to cause dynamic VARs to be injected into the network. Controller 60 uses a Proportional plus Integral (PI) control loop algorithm with a target set to prevent the voltage from drifting outside the band. As soon as D-VAR® statcoms 30 start injecting dynamic VARs, a capacitor timer is initiated. If the voltage settles to a value within the band on its own, the D-VAR® statcom 30 simply ramps back down. However, if the utility power network continues to require dynamic VARs for a time period as long or longer than the time needed for the capacitor timer to expire, then controller 60 will request that a capacitor be switched on or off depending on which limit is reached, low or high. Because there can be a very large variability in the delay between the request for a capacitor bank to be switched and the actual switching itself, the system does not "know" when the transient will occur.

For example, some of the capacitor banks used for regulation may be located miles away and accessed via a SCADA system while others are local and triggered with the high speed switches. Therefore, after requesting a capacitor bank 50a, 50b, the system continues to hold the voltage at its target level. When a capacitor bank 50a, 50b is finally switched, the transient will move the voltage toward the center of the band. Since the dynamic voltage system 10 is attempting to hold the edge, this will initially look like a negative error which will be compensated for by the PI control algorithm. As a result the dynamic VAR output of the D-VAR® statcoms 30 will be quickly ramped off. This reduces the net transient of the capacitor switch. At that point, the voltage will be within the band and the D-VAR® statcoms will return to monitoring and wait for the voltage to again exceed one of the band edges.

Slow Capacitor Switching Profile

The primary control of capacitor banks 50a, 50b by controller 60 is based on the output of inverters 36 of D-VAR® statcoms 30 either by MVARs or, equivalently, by the current required in the inverters. Ideally, capacitor banks 50a are sized to accommodate the full range of voltage regulation and capacitor banks 50b are sized to provide the larger VARs required to prevent voltage collapse in conjunction with capacitor banks 50a. Generally, if the dynamic voltage system 10 requires significant capacitive/boosting MVARs for an extended period, it will want to replace these dynamic VARs with static VARs by switching in a capacitor bank. Conversely, inductive VARs being used to hold the voltage down will eventually call for the removal of a capacitor bank. If all of the capacitors have been previously removed, inductive VARs from D-VAR® statcoms 30 will be used to hold down the voltage until reactor 40 is switched on. It is further appreciated that generally a higher dynamic VAR output will call for a capacitor switching event sooner than an incrementally lesser VAR output, and that there are predetermined minimum and maximum capacitor switching intervals and corresponding VAR levels.

Figure 5:
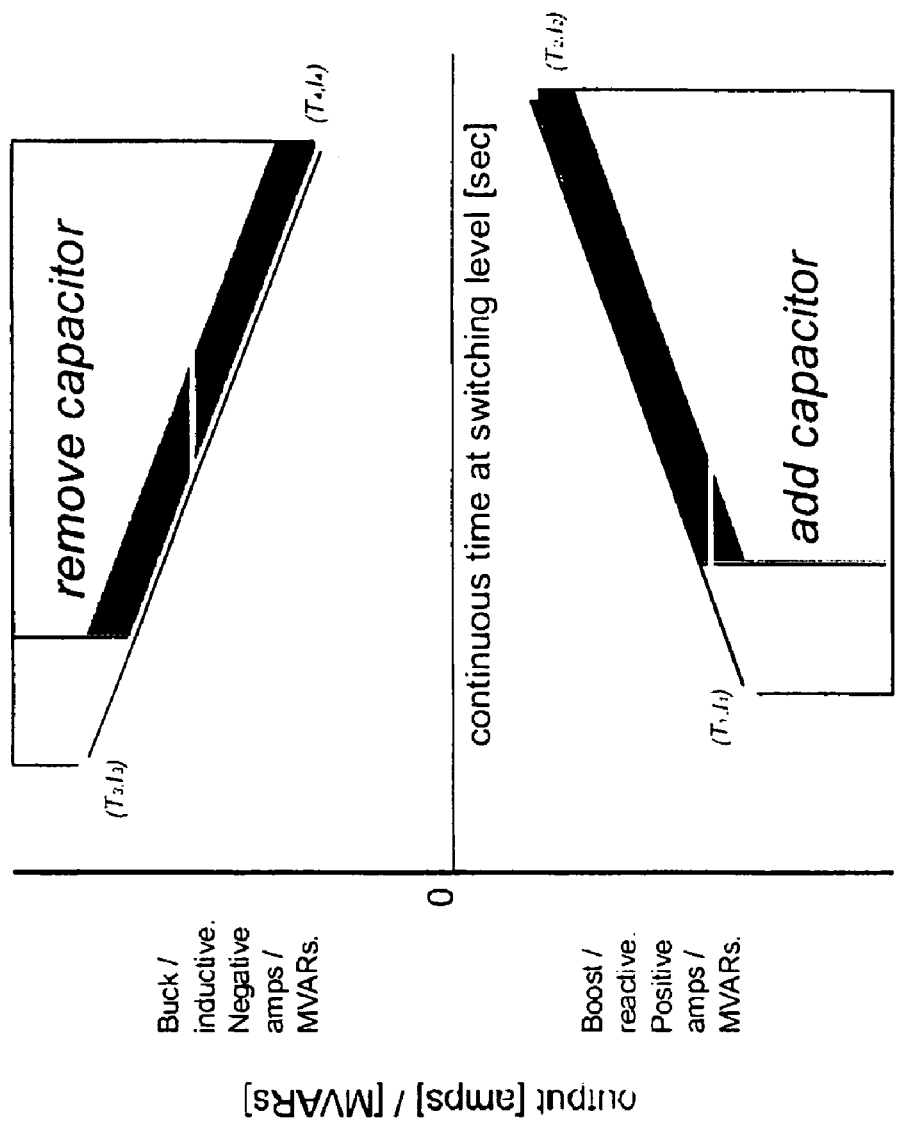
FIG. 5 is a graph illustrating the relationship between VAR output as a function of time for the dynamic voltage system of FIG. 2.

Referring to FIG. 5, for continuously maintained current outputs of magnitude $I_2$ boosting or $I_4$ bucking, a capacitor switch operation will be called for if such an operation is possible (i.e., a capacitor is available to be switched. In such situations, capacitor switching will occur after the output is being commanded for $T_2$ or $T_4$ seconds, (points 70, 72) respectively. Greater current outputs will result in capacitor bank switching transactions occurring sooner, limited by the minimum switching times $T_1$ or $T_3$. Output magnitudes greater than $I_1$ boosting or $I_3$ bucking cause capacitor switching at the same minimum switching times. The output-switching time profiles in between the minimum and maximum switching times are linear.

Current outputs of magnitudes less than $I_2$ boosting or $I_4$ bucking will not result in capacitor switching. Furthermore, the counters that implement the capacitor switching profiles reset when commanded currents drift back into the non-switching zone. All of the time (T) and current (I) values above can be preset. Aside from the limitation that $T_2 > T_1$ and $T_4 > T_3$, there are few absolute restrictions. For reasons of numerical representation, there are implicit minima and maxima for the values.

For this system, the minimum delay timer for changing a capacitor should be larger than the maximum duration "transient" event. In other words, one doesn't want to switch one of the slow regulation capacitors because of a fault on the system. Typically, therefore, this is set to about 5–10 seconds. The output for that time is 1.0 PU or the rated steady state dynamic VAR output. Typically the minimum output requiring a capacitor switch will be a very small value. The time delay for that can be set at several minutes. Thus, if the voltage barely passes outside the band such that the D-VAR® is injecting a minimal amount of VARs then it will do that for several minutes before switching a capacitor. This helps reduce unnecessary capacitor switch events since, in this scenario it is likely that the voltage may return on its own such that all the D-VAR® statcoms need to do is simply ramp back off.

PI Control Loop Gains

The PI gains are only applicable to the dynamic VAR portion of the output. They are user settable parameters so they can be set based on expected system response. Also, recognize that unlike an SVC, these parameters are primarily used when the control algorithm has determined that a capacitor bank 50a, 50b needs to be switched in/out for slow regulation control. As discussed above, if capacitor banks 50a are appropriately sized, capacitor banks 50b may not be required for slow regulation control. The D-VAR® statcoms 30 generally only move the voltage a few percent at rated output and thus the opportunity for unstable behavior and/or oscillations is significantly reduced. Under slow control conditions, the capacitor timer profile will limit the injection/removal of static VARs to the minimum delay time threshold. So, although the DVC has the same range as an SVC, the control of capacitors for slow control makes it look much smaller in the dynamic sense and hence precludes many of the instability problems.

Note that the choice of an allowable voltage range from 1.0 to 1.04 PU is integrally coupled to the size of the capacitor banks 50a, 50b being switched. The key is that when a capacitor bank switches, the voltage should end up near the center of the target band. If the capacitor banks 50a, 50b are too large or the allowed voltage range is too narrow then there can be a conflict where switching a capacitor bank takes the voltage from one side of the band to the other. If that happens, the dynamic voltage system 10 may then determine that the capacitor bank 50a, 50b needs to be added, then removed, then added, etc. Thus, by setting the band at twice the expected capacitor switch alone and also accounting for the D-VAR® output, this type of on/off/on type behavior will not occur. However, if the width of the deadband is decreased significantly, then an additional software detection algorithm for this phenomenon will be employed and the system can either generate a warning, an alarm, and/or dynamically increase the deadband under these conditions. The use of a deadband significantly increases the stability of this control system without causing the customer system to deviate from acceptable levels. Other control schemes exist where, in principle, the dynamic voltage system 10 could hold the voltage closer to the midpoint by using dynamic VARs and then capacitor banks only switched when that is no longer sufficient. The penalty is that the dynamic VARs will run virtually non-stop thereby increasing losses.

Fast Voltage Sags

The majority of the time, dynamic voltage system 10 will not be producing dynamic VARs and the system will be idle with the necessary static VARs on-line to hold the voltage within the deadband. In that mode, dynamic voltage system 10 is also looking for a sag event with a drop in the voltage of greater than 10–15% of the nominal voltage. In that event, the dynamic voltage system 10 immediately takes action to compensate. The dynamic voltage system 10 can optionally use knowledge of the location of the fault with information from current transformers (CTs) 21 (see FIG. 2) placed on each connection to bus 110, recent measurements of power flow, and the measured depth of the sag event to determine the number of capacitor banks 50*a*, 50*b* that are required to be switched-in quickly. For example, techniques for supplying power to the utility network based on whether the fault is a near fault or a far fault are described in U.S. Pat. No. 6,600,973, entitled, Method And Apparatus For Providing Power To A Utility Network," which is incorporated herein by reference. Dynamic voltage system 10 uses the fast-switched capacitor banks 50*a*, 50*b* for this purpose. By basing the amount of fast-switched capacitor banks 50*a*, 50*b* on knowledge of the system dynamics, the likelihood of an overshoot at the end of the event is prevented. In addition to the fast-switched capacitor banks 50*a*, 50*b*, the system also injects dynamic overload VARs to assist in pushing the voltage up. In this case although truly a closed loop control, this is effectively open loop since the errors are sufficiently large that the PI control loop will simply saturate at the full dynamic VAR overload output.

When the fault clears, there are two characteristically different profiles. In one case, the underlying voltage quickly recovers to the pre-fault levels. In the other, the system spends a significant time at depressed levels (<1.0 PU) before slowly recovering. The former case is likely to occur if the load is light or if the fault clears without affecting the system characteristics significantly. In these cases, the system will have switched in only a small fraction of the available capacitors along with the full overload injection of the dynamic VARs. When the voltage reaches the 0.9 PU level, dynamic voltage system 10 quickly starts pulling out the fast-switched capacitor banks 50*a*, 50*b*. If the voltage continues to rise, the rate at which the capacitor banks are removed increases until the number of capacitor banks in service are at the pre-fault level. If the voltage increases more than 5% above the pre-fault levels, then the D-VAR® statcoms 30 will also join in by injecting dynamic inductive VARs to reduce the overshoot until the fast-switched capacitor banks 50*a*, 50*b* are physically switched out. If there are additional fast-switched capacitor banks 50*a*, 50*b* that are switched in and the voltage is high, those too will be taken out in a staggered fashion to return the voltage within the deadband. At that point, controller 60 will use its slow control logic to switch any other capacitor banks, including some potentially controlled via a SCADA system such as local or distant slow switched capacitors (e.g., "slow" capacitor switches 114 in FIG. 1), for any fine tuning of the voltage if necessary. The second scenario is that the voltage recovers above a critical level, (e.g., 0.90 PU) but then only slowly recovers to within the deadband. First, controller 60 will use its slow control logic and continue to run. If the D-VAR® statcoms 30 are generating significant VARs for several seconds, the slow control will start adding additional capacitor banks 50*a*, 50*b* to pull that voltage to within the normal band. Once that is achieved it will ramp off and the normal slow control logic will continue to operate. An additional scenario is that the initial insertion of capacitor banks 50*a*, 50*b* is insufficient in getting the voltage back above the critical level. If the voltage does not recover to, for example, 90% of nominal within a fixed time from the switching of the initial capacitor banks then additional banks will be switched in.

In the case of a worst-case fault requiring the insertion of significant amounts of fast-switched capacitor banks 50*b*, the switching "out" of these banks is carried out earlier once the voltages recover to acceptable levels. For example, one can use capacitor banks of larger size for these worst case scenarios and then switch them back out at a lower level so they do not lead to significant overshoots.

Figure 6:
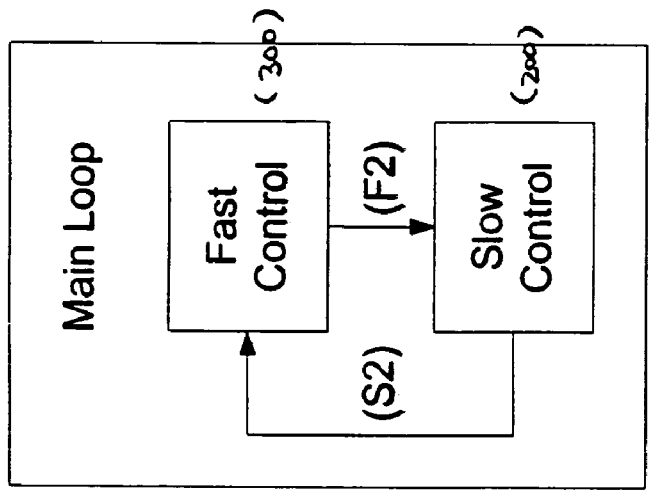
FIG. 6 is a flow diagram illustrating the general steps for operating the dynamic voltage system.

In view of the discussion above, FIGS. 6, 7A–7C, and 8A–8C summarize the operation of dynamic voltage system 10. Referring to FIG. 6, operation of dynamic voltage system 10 is based on two different modes: slow control mode (200) and fast control mode (300). As described above, slow control mode provides long term regulation of the voltage on the utility power network while the fast control mode is based on the occurrence of a significant fault on the high voltage bus. Thus, controller 60 continuously monitors the utility power network for conditions that cause dynamic voltage system 10 to initiate either or both of slow control mode (200) and fast control mode (300).

Figure 7A:
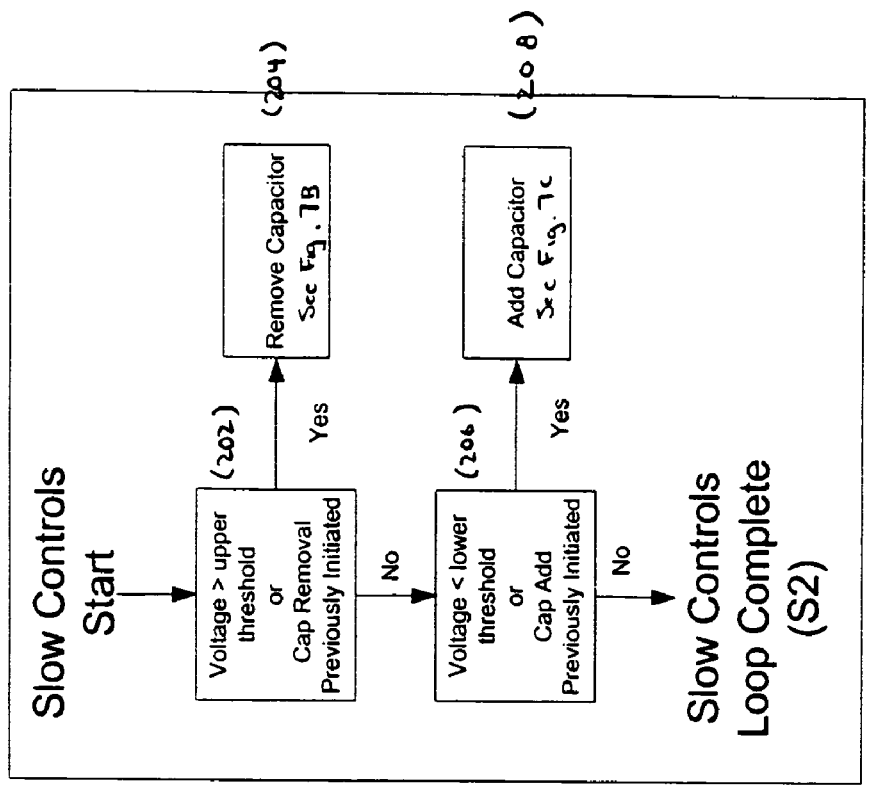
FIGS. 7A–7C are flow diagrams illustrating the general steps for operating the dynamic voltage system in slow mode.
Figure 7C:
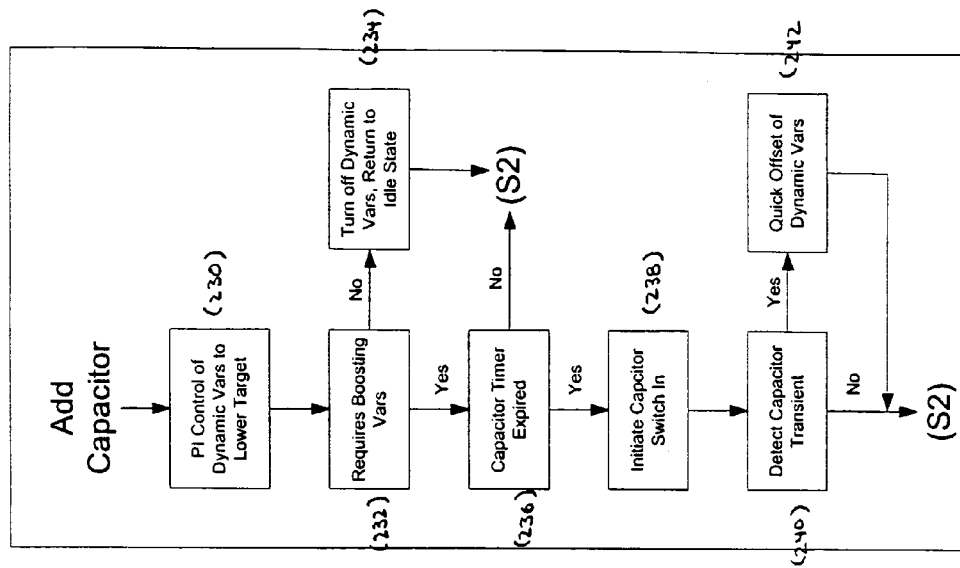
Figure 7B:
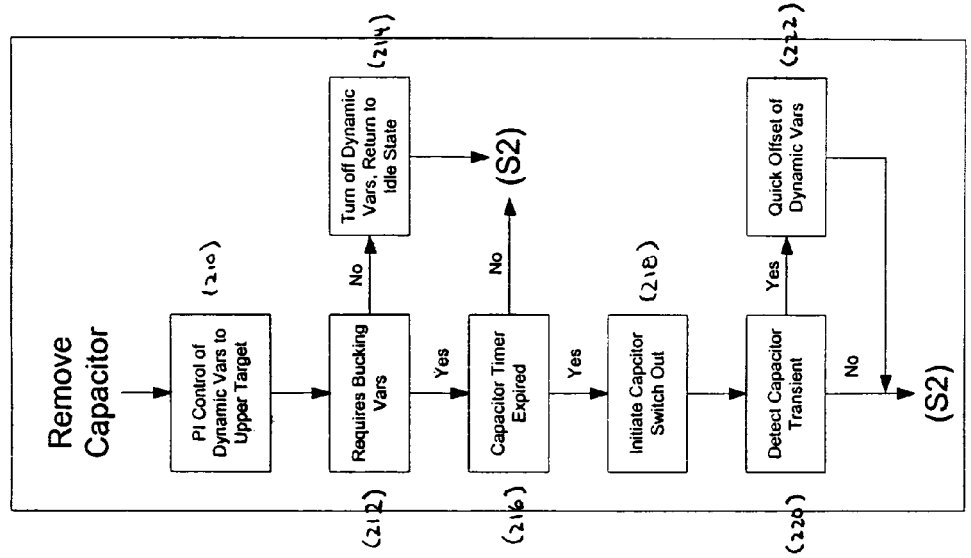

Referring to FIGS. 7A–7C, in slow control mode, the voltage is monitored and a determination is made as to whether the voltage is greater than a predetermined threshold (e.g., >1.04 PU) or that removal of a capacitor bank was previously initiated (202). If so, a capacitor bank is removed (204). If not, a determination is made as to whether the voltage is less than a predetermined threshold (e.g., <1.00 PU) or that addition of a capacitor bank was previously initiated (206). If so, a capacitor bank is added (208). If not, the slow control loop is completed and the controller continues to execute code at state 300. (Referring to FIG. 7B, to remove a capacitor bank, PI control of dynamic VARs is initiated to achieve the upper target (210). A determination is made as to whether bucking VARs are required (212). If not, controller 60 deactivates D-VAR® statcoms 30 and the system is returned to its idle state (214). If bucking VARs are required, a determination is made to see if the capacitor timer has expired (216). If so, the capacitor bank is removed (218) and a determination is made as to whether any capacitor transients are detected (220). If the capacitor timer has not expired or if no capacitor transients are detected, the slow mode loop (see FIG. 7A) is initiated. If capacitor transients are detected, a quick offset of dynamic VARs is provided (222).

Referring to FIG. 7C, to add a capacitor bank, PI control of dynamic VARs is initiated to achieve the lower target (230). A determination is made as to whether boosting VARs are required (232). If not, controller 60 deactivates D-VAR® statcoms 30 and the system is returned to its idle state (234). If boosting VARs are required, a determination is made to see if the capacitor timer has expired (236). If so, the capacitor bank is added (238) and a determination is made as to whether any capacitor transients are detected (240). If the capacitor timer has not expired or if no capacitor transients are detected, the slow mode loop (see FIG. 7A) is initiated. If capacitor transients are detected, a quick offset of dynamic VARs is provided (242).

Figure 8B:
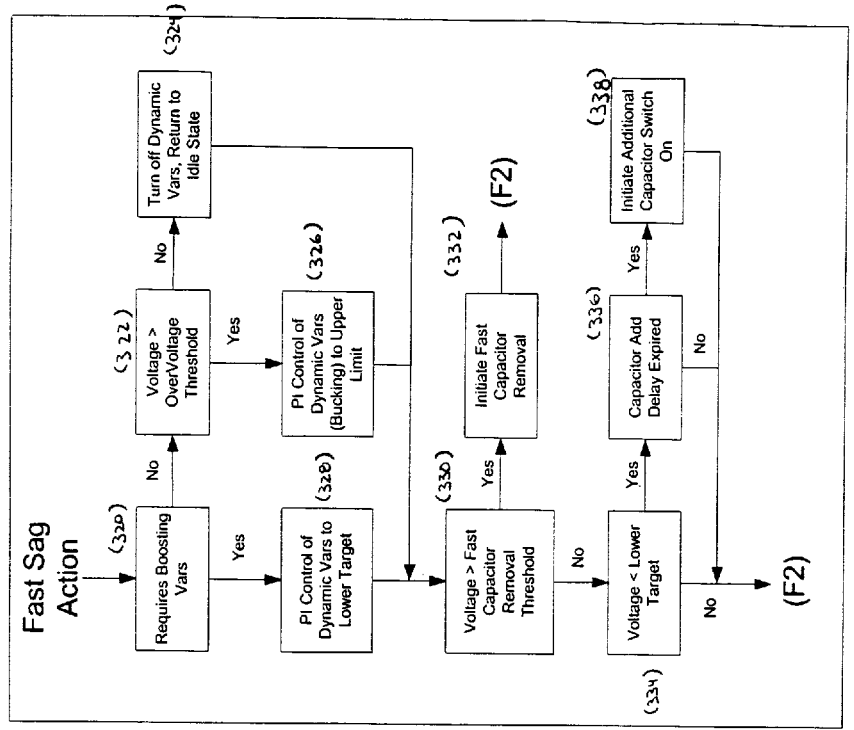
FIGS. 8A–8C are flow diagrams illustrating the general steps for operating the dynamic voltage system in fast mode.
Figure 8A:
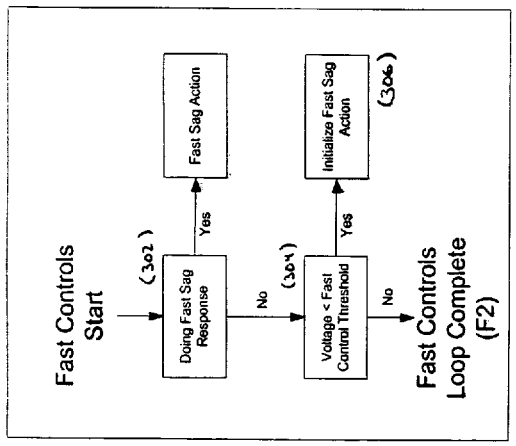
Figure 8C:
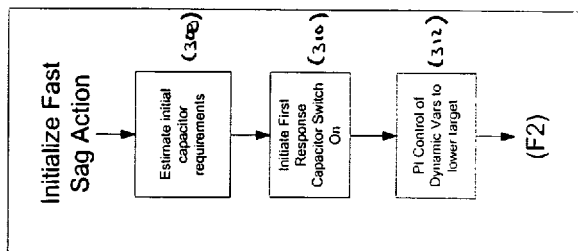

Referring to FIG. 8A, in fast control mode, a determination is made as to whether dynamic voltage system 10 is already performing compensation due to a sag (302). If not, a determination is made as to whether the voltage is less than a fast control threshold (304) (e.g. delta-V>10–15%). If so, fast sag action is initiated (306). Referring to FIG. 8C, sag action is initialized by first estimating the initial capacitor requirements (308), activating a first one of the capacitor banks 50*a*, 50*b* (310), and providing PI control of dynamic VARs from D-VAR® statcoms to lower the target (312).

Referring to FIG. 8B, in a fast sag action, a determination is made as to whether boosting VARs are required (320). If not, the voltage is monitored to see if it is greater than the predetermined overvoltage threshold (e.g. delta-V>5%) (322). If not, controller 60 deactivates D-VAR® statcoms 30 and the system is returned to its idle state (324). If the voltage is greater than the predetermined overvoltage threshold bucking VARs are required, through PI control of dynamic VARs from D-VAR® statcoms to achieve the upper target (e.g., 5–10% above nominal voltage) is provided (326) to hold the voltage near the original prefault levels. If boosting VARs are not required, PI control of dynamic VARs from D-VAR® statcoms to achieve the lower target is provided (328).

The voltage is then monitored to see if it is greater than the predetermined fast capacitor removal (330) (e.g. delta-V>5%). If so, controller 60 transmits control signals to remove one of the capacitor banks 50*a*, 50*b* (332). If not, the voltage is monitored to see if it is less than the lower target (e.g. 0.9 PU) (334). If so, controller 60 begins a delay counter and a determination is made to see if the capacitor delay has expired (336). If so, controller 60 transmits control signals to add an additional one of the capacitor banks 50*a*, 50*b* (338).

Still other embodiments are within the scope of the claims. Techniques for minimizing potential transients (e.g., oscillatory "ringing") imposed on the utility waveform caused by the generally step-like change in voltage when capacitor banks 50*a*, 50*b*, as well capacitors 114, are connected to the utility power network can be used. For example, the techniques described in U.S. Ser. No. 09/449,378, entitled "Reactive Power Compensation to Minimize Step Voltage Changes and Transients," which is incorporated herein by reference, can be used with dynamic voltage system 10. In general, during the initial period in which a capacitor bank 50*a*, 50*b* begins delivering reactive power to the utility power network, D-VAR® statcoms 30 and/or reactor 40, under the control of controller 60, provide an inductive reactance to counteract the abrupt, step-like introduction of capacitive reactive power from capacitor bank 50*a*, 50*b* on the utility power network. For example, in response to the need to connect a capacitor bank to the utility power network, controller 60 activates the D-VAR® statcoms 30 and/or reactor 40 and, substantially simultaneously, causes the capacitor bank to be connected to the utility power network. Furthermore, D-VAR® statcoms 30 can be controlled to provide additional voltage support to the system prior to capacitive banks 50*a*, 50*b* being connected to the utility power.

Further, although high-speed communication line 54 is in the form of a fiber optic line, other forms of high-speed communication links including wired or wireless (e.g., RF) techniques can be used. Further, different numbers and amounts of capacitors or capacitor banks or reactors can be switched on the distribution or transmission voltage bus. In the above embodiment, capacitor banks 50*a* were connected to a medium voltage bus 108 while capacitor banks 50*b* were connected to the higher voltage transmission line 110. However, in other applications, dynamic voltage system 10 may only require capacitor banks 50*a* on medium voltage bus 108 or only require the higher VAR capacitor banks 50*b* on transmission line 110. Similarly, different numbers of D-VAR® statcoms can be added to adjust the dynamic portion of the dynamic VAR compensation solution. A custom interface and solenoid driver could be developed for the switch to integrate communication, diagnostic, and protection functions and provide faster switching. The controller could also be augmented to include directional power flow signaling and yield more intelligent capacitor switching algorithms. Switched inductors can be added for solutions requiring lagging VARs or over-voltage regulation.

What is claimed is:

1. A system for connection to a utility power network, the system comprising:
   a reactive power compensation device coupled to the network and configured to transfer reactive power between the utility power network and the reactive power compensation device;
   a capacitor system configured to transfer capacitive reactive power between the utility power network and the capacitor system;
   an electro-mechanical switch for connecting and disconnecting the capacitor system to the utility power network;
   an interface associated with the electro-mechanical switch;
   a controller configured to provide control signals for controlling the electro-mechanical switch; and
   a communication channel for coupling the controller to the interface associated with the electro-mechanical switch; and
   the electro-mechanical switch, interface, controller, and communication channel together configured to connect or disconnect the capacitor system from the utility power network within about three line cycles or less of the nominal voltage frequency when a fault condition is detected on the utility power network.

2. The system of claim 1 wherein the electro-mechanical switch, interface, controller, and communication channel together configured to connect or disconnect the capacitor system from the utility power network in less than 80 msecs from a fault condition being detected on the utility power network.

3. The system of claim 2 wherein the electro-mechanical switch, interface, controller, and communication channel together configured to connect or disconnect the capacitor system from the utility power network in less than 50 msecs from a fault condition being detected on the utility power network.

4. The system of claim 1 wherein the communication channel is a fiber optic channel.

5. The system of claim 1 wherein the interface is configured to receive digital control signals from the controller.

6. The system of claim 1 further comprising an inductive reactor configured to transfer inductive reactive power to the utility power network.

7. The system of claim 1 further comprising a plurality of capacitor systems, each configured to transfer capacitive power between the utility power network and a respective one of the plurality of capacitor systems.

8. The system of claim 7 wherein each of the plurality of capacitor systems is coupled to a corresponding electro-mechanical switch, the controller configured to operate each of the plurality of capacitor systems using a corresponding electro-mechanical switch.

9. The system of claim 7 wherein following a predetermined time period, the controller monitors whether to connect an additional one of the plurality of capacitor systems or disconnect one of the plurality of capacitor systems.

10. The system of claim 7 wherein the controller is system is configured to initially activate a predetermined subset of the capacitor systems.

11. The system of claim 1 wherein the reactive power compensation device is configured to provide voltage regulation.

12. The system of claim 1 wherein the reactive power compensation device is configured to provide reactive power to the utility power network to 0.90 P.U. of the nominal voltage within two seconds.

13. The system of claim 1 further comprising at least one mechanically-switched capacitor, each configured to transfer capacitive power to the utility power network in response to a signal from the controller.

14. The system of claim 1 wherein the reactive power compensation device comprises an inverter.

15. The system of claim 14 wherein the reactive power compensation device comprises an array of inverters.

16. The system of claim 1 wherein the controller is configured to, in response to the need to connect the capacitor system to the utility power network, activate the reactive power compensation device and, substantially simultaneously, cause the capacitor system to be connected to the utility power network.

17. A method for stabilizing a utility power network comprising:
electrically coupling to the utility power network:
a reactive power compensation device configured to transfer reactive power between the utility power network and the reactive power compensation device;
at least one capacitor system configured to transfer capacitive power between the utility power network and the at least one capacitor system, the at least one capacitor system including an electro-mechanical switch;
detecting a fault condition on the utility power network; and
in response to detecting the fault condition, operating the at least one electro-mechanical switch within about three line cycles or less of the nominal voltage frequency.

18. The method of claim 17 further comprising coupling a controller to the at least one electro-mechanical switch with a fiber optic communication channel.

19. The method of claim 18 wherein the electro-mechanical switch includes an interface for receiving digital control signals from the controller.

20. The method of claim 17 further comprising:
coupling a plurality of capacitor systems to the utility power network, each associated with a corresponding electro-mechanical switch and each configured to transfer capacitive power between the utility power network and a respective one of the plurality of capacitor systems; and
monitoring, with the controller, whether to activate an additional one of the plurality of capacitor systems or deactivate one of the plurality of capacitor systems.

21. The method of claim 20 further comprising initially activating a predetermined subset of the capacitor systems.

22. The method of claim 17 further comprising controlling, by the controller, the reactive power compensation device to provide reactive power to the utility power network to 0.90 P.U. of the nominal voltage within 2 seconds.

23. The method of claim 17 further comprising coupling to the utility power network, at least one mechanically-switched capacitor, each configured to transfer capacitive power to the utility power network in response to a signal from the controller.

24. The method of claim 17 wherein the reactive power compensation device comprises at least one inverter.

25. The method of claim 17 further comprising, in response to the need to connect the at least one capacitor system to the utility power network, activating the reactive power compensation device and, substantially simultaneously, causing the at least one capacitor system to be connected to the utility power network.

26. The method of claim 17 further comprising, prior to detecting a fault condition on the utility power network, controlling the reactive power compensation device to provide voltage regulation of the utility power network.

27. The method of claim 26 wherein controlling the reactive power compensation to provide voltage regulation includes:
if the nominal voltage on the utility power network is greater than a predetermined upper threshold deactivating at least one of the plurality of capacitor systems; and
if the nominal voltage on the utility power network is less than a predetermined lower threshold activating at least one of the plurality of capacitor systems.

28. The method of claim 27 wherein the predetermined upper threshold is 1.04 P.U. and the predetermined lower threshold is 1.00 P.U.

29. The method of claim 28 wherein activating the reactive power compensation device if boosting VARS are required and if a predetermined capacitor timing period has expired.

30. The method of claim 29 further comprising:
deactivating at least one of the capacitor systems if the nominal voltage is greater than a fast capacitor removal threshold; and
activating at least one of the capacitor systems if the nominal voltage is less than the predetermined fast control threshold.

31. The method of claim 30 wherein the fast capacitor removal threshold is greater than 5% of the nominal voltage.

32. The method of claim 29 wherein the predetermined capacitor timing period is dependent on the reactive power output of reactive power compensation device.

33. The method of claim 27 further comprising if the nominal voltage on the utility power network is less than a predetermined fast control threshold:
activating at least one of the plurality of capacitor systems; and
controlling the reactive power compensation device to increase VAR injection from the reactive power compensation device.

34. The method of claim 33 wherein the predetermined fast control threshold is greater than 10% of the nominal voltage.

35. The method of claim 34 further comprising:
controlling the reactive power compensation device to increase VAR injection from the reactive power compensation device if boosting VARs are required;
controlling the reactive power compensation device to decrease VAR injection from the reactive power compensation device if boosting VARs are not required and if the nominal voltage is less than a predetermined overvoltage threshold; and
controlling the reactive power compensation device to increase VAR injection from the reactive power compensation device if boosting VARs are not required and if the nominal voltage is greater than the predetermined overvoltage threshold.

36. The method of claim 35 wherein the predetermined overvoltage threshold is greater than 5% of the nominal voltage.

37. The method of claim 27 wherein if bucking VARS are required and if a predetermined capacitor timing period has expired, deactivating the reactive power compensation device.

38. The method of claim 37 wherein the predetermined capacitor timing period is dependent on the reactive power output of reactive power compensation device.

* * * * *